Figure 1:
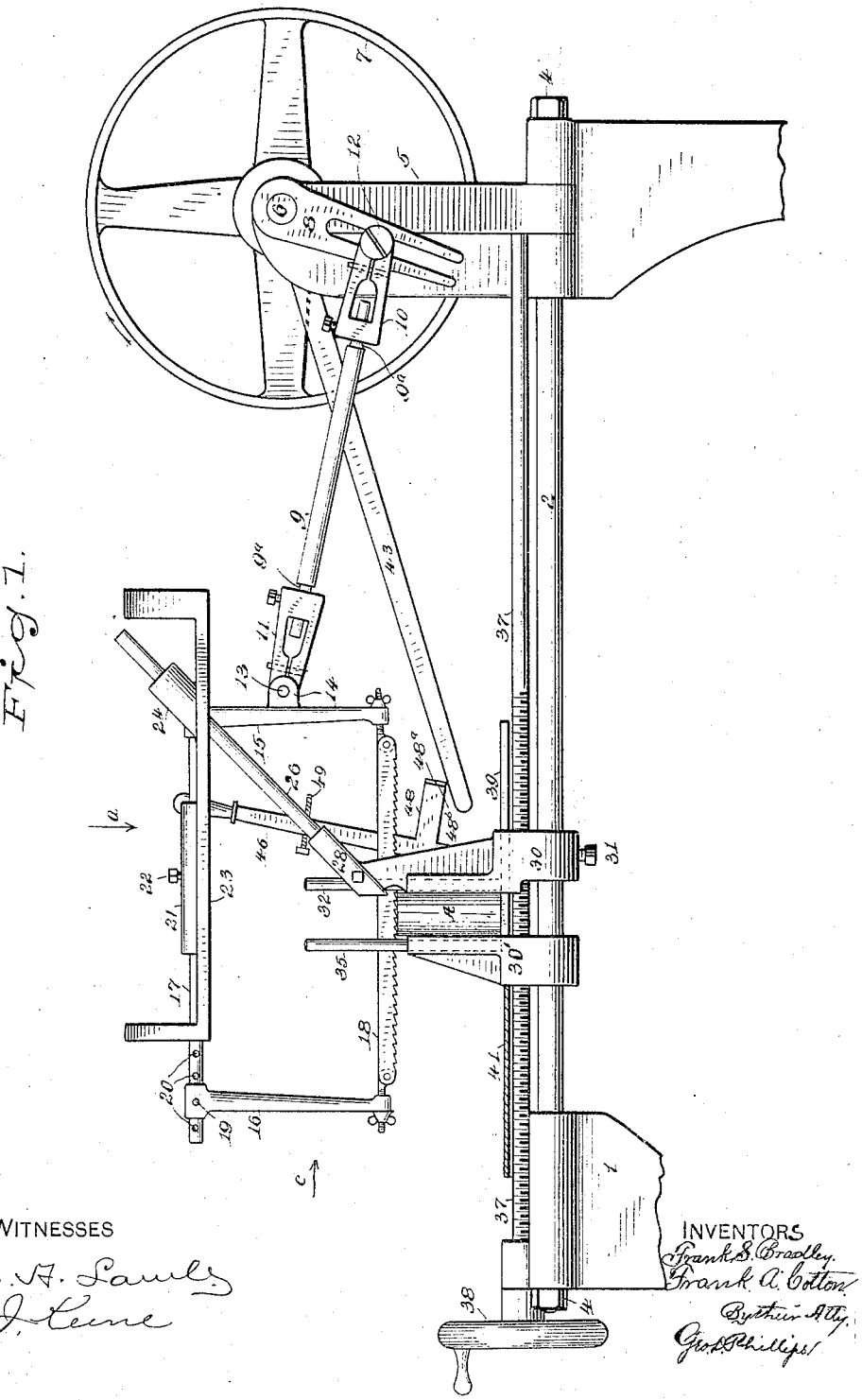

(No Model.) 3 Sheets—Sheet 1.

F. S. BRADLEY & F. A. COTTON.
HACK SAW MACHINE.

No. 604,714. Patented May 31, 1898.

WITNESSES

INVENTORS
Frank S. Bradley.
Frank A. Cotton.

(No Model.) 3 Sheets—Sheet 2.
F. S. BRADLEY & F. A. COTTON.
HACK SAW MACHINE.
No. 604,714. Patented May 31, 1898.
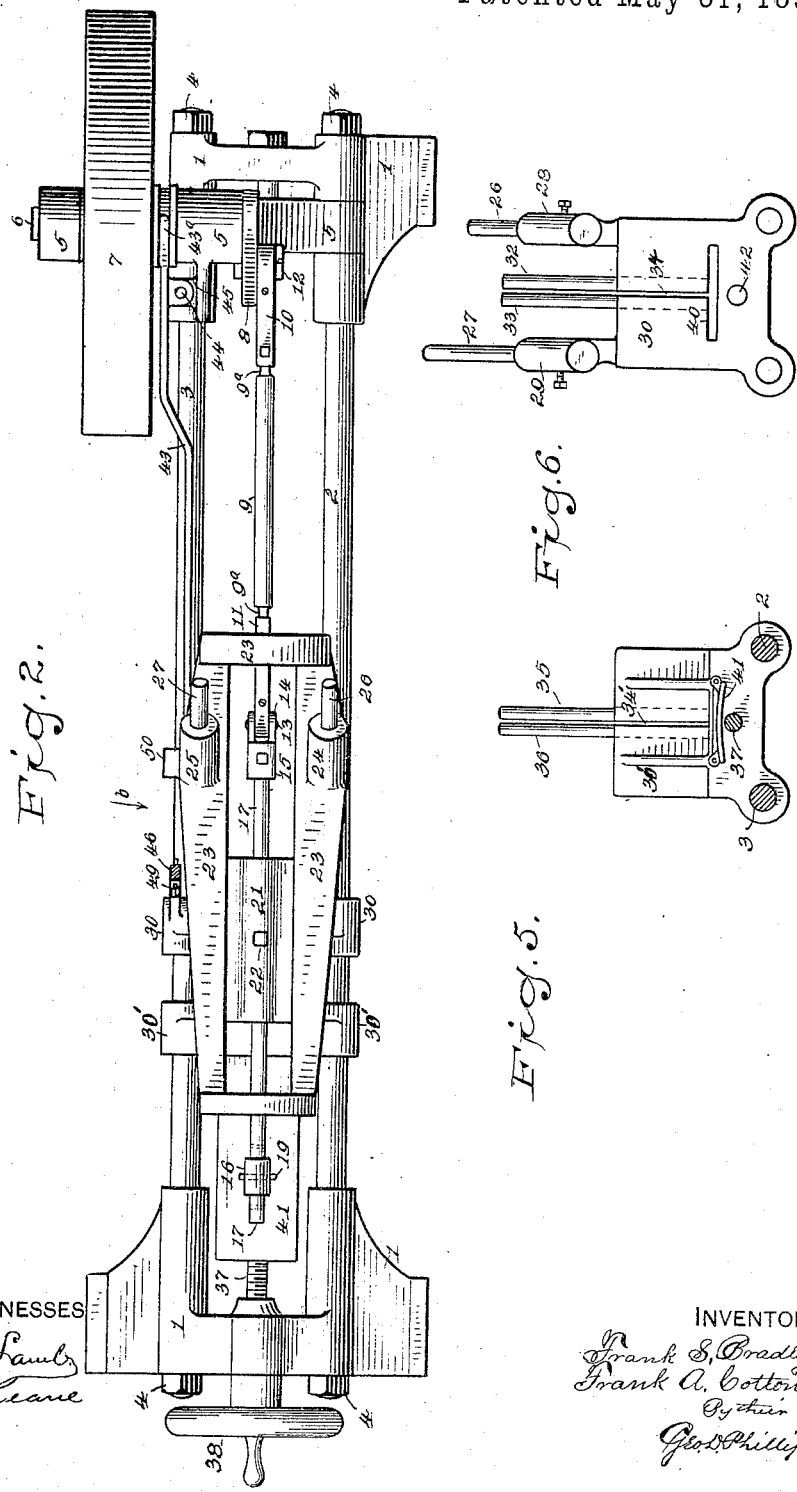
WITNESSES
INVENTORS
Frank S. Bradley
Frank A. Cotton
By their Atty.
Geo. D. Phillips (No Model.) 3 Sheets—Sheet 3.
F. S. BRADLEY & F. A. COTTON.
HACK SAW MACHINE.
No. 604,714. Patented May 31, 1898.
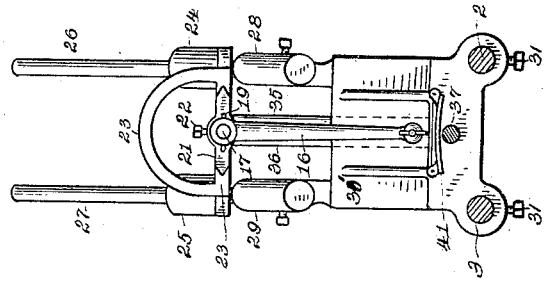
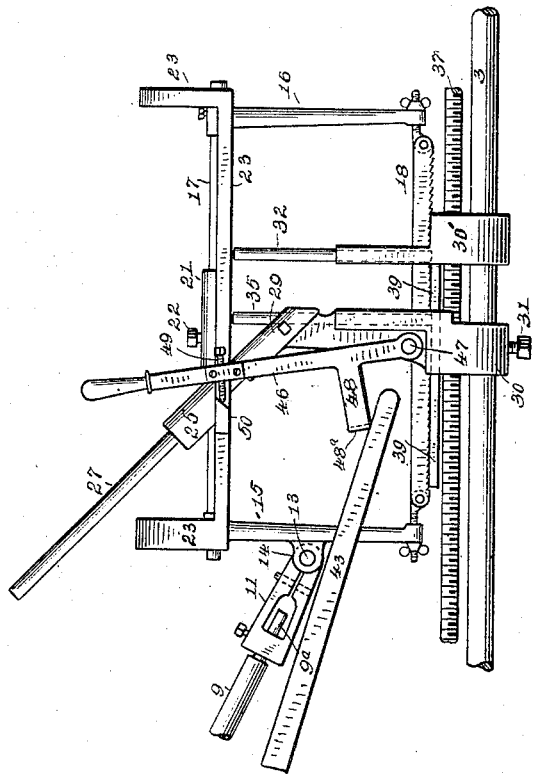
WITNESSES
INVENTORS.
Frank S. Bradley.
Frank A. Cotton.
By their Atty.
Geo. D. Phillips

UNITED STATES PATENT OFFICE.

FRANK S. BRADLEY AND FRANK A. COTTON, OF NEW HAVEN, CONNECTICUT.

HACK-SAW MACHINE.

SPECIFICATION forming part of Letters Patent No. 604,714, dated May 31, 1898.

Application filed December 22, 1897. Serial No. 663,083. (No model.)

*To all whom it may concern:*

Be it known that we, FRANK S. BRADLEY and FRANK A. COTTON, citizens of the United States, and residents of New Haven, in the county of New Haven and State of Connecticut, have invented certain new and useful Improvements in Hack-Saw Machines, of which the following is a specification.

Our invention relates to an improvement in hack-saw machines, which improvement consists of means whereby the saw-frame support is balanced on angularly-disposed guide-rods projecting from one of the jaws of the work-holding vise, so that the saw is relieved or disengaged from the work on its backward stroke and caused to engage firmly on its forward stroke at any period of its operation without any compensating weight therefor; means for automatically arresting the further downward progress of the saw when it has reached the bottom of the work; a holding-vise so constructed that the saw may reciprocate without doing any damage to said device or other parts of the machine, and means for automatically stopping the saw at any period of its work.

Another improvement consists in operating the saw in the center or body of the vise so that work of various kinds may be done besides simply cutting off sections from a rod or bar, and means whereby the saw is guided in its work from start to finish by guides formed in the body of the work-holding jaws and in the continuation of this guiding feature above such jaws, so that a great variety of small sections or pieces may be operated upon and different designs or patterns made therefrom.

These and other improvements will be noted more particularly in the following specification, and such characteristic features believed to be new and novel particularly pointed out in the claims.

Heretofore hack-saw machines have been used merely for cutting off sections from a rod or bar and there was no means provided for positively guiding the saw from the beginning to the end of its work. With small rods this objection was not serious; but in cutting off large pieces from a bar of steel from two inches square or over the saw will run to such an extent that considerable allowance must be made for truing up the ends, and consequently a corresponding loss of stock. The saw, too, has been operated at the end of the work-holding vise, which renders the machine unavailable for any other purpose than simply cutting off sections from a rod or bar, and the pressure on the saw was as great on its backward as on its forward stroke, so that the life or period of durability of the saw was materially lessened. As the saw gradually lost its keen cutting edge the weight had to be shifted to compensate for this condition, so that more or less care and watchfulness was needed in running a machine which required a varying pressure on the saw-blade. These objectionable features have all been overcome in our improved machine.

To enable others to understand our invention, reference is had to the accompanying drawings, in which—

Figure 1 represents a side elevation of the machine with the saw-frame and its support elevated and the saw within the guide-pins and just above the top of the work-holding jaws and about to engage with a piece in the jaws, also broken view of the machine-legs and central sectional view of the shield on the front of the movable jaw to protect the adjusting-screw from the chips. Fig. 2 is an upper plan view of the machine, looking in the direction of arrow *a* of Fig. 1, and broken view of shipper-handle. Fig. 3 is a side elevation, looking in the direction of arrow *b*, Fig. 2, of the work-holding jaws, saw-frame and its support, and broken view of the pitman, shipper-bar, adjusting-screw for the front jaw, and side supporting-rods. Fig. 4 is a front elevation looking in the direction of arrow *c*, Fig. 1, with the shipper-handle and shipper-bar removed. Fig. 5 is a detail front elevation of the forward or adjustable work-holding jaw. Fig. 6 is a detail front elevation of the rear work-holding jaw and broken view of the guide-rods of the saw-frame support. Fig. 7 is a detail view of the side and top of the end of the projecting arm of the shipper-handle lever that engages with the shipper-bar.

Its construction and operation are as follows:

1 represents the machine-legs.

2 and 3 are two supporting-rods that form a support for the work-holding jaws and on which such jaws are adapted to be longitudinally adjusted. The ends of said rods extend through holes in the upper part of the legs, and such legs and rods are firmly bound together by means of the nuts 4 on the threaded ends of such rods. 5 is a standard also mounted on said rods, which standard supports the crank-shaft 6, and on this shaft is mounted the driving-pulley 7 and the slotted crank 8.

The pitman consists of the rod 9, having the reduced ends $9^a$, adapted to be adjustably supported in the blocks 10 and 11, the former of which is pivotally supported on the pin 12 of the crank 8, while the other is pivotally supported on the pin 13 of the ears 14, projecting from the rear arm 15 of the saw-frame. The slotted crank 8 enables the stroke of the saw-frame to be varied, while the adjustable features of the pitman will so adjust the distance between the saw-frame and the crank-shaft that the entire cutting edge of the saw may be utilized. The two arms 15 and 16 are mounted on the rod 17 and carry the saw 18. The arm 16 is secured to said rod by the pin 19, passing through a hole in such rod. 20 are other holes adapted to furnish different positions for the arm 16, so that saws of different lengths may be used. The rod 17 of the saw-frame is also adjustably secured in the slide 21 by the screw 22. This slide, Fig. 4, is adapted to operate in V-shaped grooves in the saw-frame support 23. Rising from the upper surface of this support are the angularly-disposed hubs or bosses 24 and 25, having holes therethrough and are adapted thereby to slide freely on the angularly-disposed guide-rods 26 and 27, which guides are secured in the hubs 28 and 29, rising from the top of the rear jaw 30. This jaw is arranged to be adjusted to any position on the supporting-rods 2 and 3 and held in such positions by the screws 31. This rear jaw has (see Fig. 6) a narrow kerf 34 in its central portion to serve as a guide for the saw and keep it in perfect vertical alinement. 32 and 33 are hardened steel pins mounted in the upper edge of this jaw and running through to the top of the floor of the movable jaw, and they are separated just far enough apart to admit the saw, and they also serve as guides to start the saw right when a piece of work is placed within the jaws, and such work extends to the top of the jaws or above. These pins being hardened, it must of necessity follow that there is no possibility of the saw running when it first begins its operation, and when it reaches the narrow kerf in the cast-iron jaw it is still guided by said pins entirely through the jaws to the said floor, as before mentioned.

The front and movable jaw 30' (see also detail view Fig. 5) has the narrow kerf 34' and the hardened-steel pins 35 and 36 similar to the rear jaw just described. This jaw is movably supported on the supporting-rods 2 and 3 by means of the screw 37 and the handle-wheel 38. The floor 39 of this jaw, Fig. 3, also moves with it, and it extends through the opening 40, Fig. 6, of the rear jaw, moving freely therein and extending rearward of such jaw, so that a supporting base or floor for the work may always be had within the capacity of the jaws.

41 is a shield attached to the front face of the jaw 30' to prevent chips falling on the threaded rod 37. 42 is a hole in the rear jaw to allow such rod to pass freely through.

The shipping device consists of the bar 43, provided with the fork $43^a$, Fig. 2, and is adapted to engage with the clutch mechanism of the driving-pulley. This bar is pivotally supported on the pin 44, projecting from the lug 45 of the standard 5.

46 is the handle-lever, pivotally supported on the pin 47 of the rear jaw 30.

48 is a rearwardly-extended arm of the handle-lever and has (see also Fig. 7) a right-angle projection $48^a$, having the beveled edge $48^b$, adapted when the said handle-lever is thrown back to engage the outer face of the shipper-bar 43 and force the clutch mechanism into engagement and start the machine. 49, Fig. 3, is an adjusting-screw carried by the said handle-lever, whose point is adapted to be engaged by the inclined face of the lug 50, projecting from the saw-frame support and unship the clutch mechanism when the saw has been carried down to the floor 39 and stop the machine. This screw 49 is also adapted to be vertically adjusted on said handle-lever. Should this unshipping mechanism fail from any cause to work, the further downward progress of the saw is arrested by engagement of the under side of the saw-frame support with the top of the two guide-rod hubs 28 and 29 of the rear jaw. While this arrangement will not stop the machine, it will prevent the saw cutting through the floor of the vise and it will simply reciprocate backward and forward and do no damage. This or a similar arrangement is absolutely necessary, as the saw operates within the body of the jaws instead of at the ends, as formerly.

It will be readily seen that this machine is not only capable of cutting off sections from a rod or bar the same as any other machine of its class, but it is also adapted to perform work that other machines are not adapted for—such, for instance, as short sections like A, Fig. 1, can be stood on end and severed in twain and the surfaces of the two sections will be true and even by reason of the fact that the means employed for guiding the saw in its vertical movements will effectually prevent its running to one side or the other. It will therefore be seen that a large variety of work can be performed on this machine that other hack-saw machines cannot do.

Other advantages are apparent by comparison—viz., the construction of the bed consisting of the two parallel supporting-rods being not only a cheaper construction than cast-iron, so far as material is concerned, but far cheaper, so far as providing means for the adjustment of the work-holding jaws; also, the adjustable feature of the saw-frame, whereby saws of different lengths can readily be used; also, the adjustable feature of the pitman, as previously described.

One of the most important improvements lies in the guiding feature of the saw-frame support. The guides projecting from the rear jaw lie at an angle of forty-five degrees, this inclination giving the best results. When, therefore, the saw is on its backward stroke, the saw-frame support will simply follow up these inclined guides just sufficient to clear the teeth and prevent their dragging on the work, and when the crank on its forward stroke propels the saw-frame forward this saw-frame support will instantly start down these inclined guide-rods until it brings up against the work, and the more friction that is brought to bear on the saw, as in a deep cut or kerf, the greater this downward tendency is, so that when the saw is partially dulled and the set worn off to a great extent the cut is inclined to narrow up and pinch the saw. In other machines this condition of affairs must be met with additional weight to keep the saw at work, and this shifting of the weight forward requires watchfulness and attention of a machine that should and was intended to be entirely automatic.

The balancing of the saw-frame support on the angularly-disposed guide-rods does away with all extra compensating weights to keep a dull saw up to its work, for, as before stated, the greater the resistance that is offered to the saw in a deep and narrow kerf the greater the downward pressure on the saw, so that if any teeth remain on the saw-blade they have got to cut, while by reason of any resistance on the blade, due to the pinching tendency before described, the saw-frame support will the more readily follow up the inclined guide-rods on its backward stroke. The saw-frame support is so well balanced on these guide-rods that when the machine is not in operation it can be raised and lowered and will maintain itself in any position on said rods without falling down. In other words, its entire weight is so supported on these rods that there is no downward pressure on the saw until it is impelled forward under the influence of the crank. This feature is of great importance in putting work in the jaws, as it leaves both hands free for this purpose, while in other machines the saw-frame has to be lifted bodily and held there.

We do not wish to be strictly confined to the exact construction of the unimportant features of our device, as these may be changed for equivalent means to suit the convenience of the maker. While, therefore, we show a crank-shaft mechanism for imparting a reciprocating motion to the saw-frame, this, it will be understood, is an old and well-known means for accomplishing such a motion, and, if desired, other means may be employed.

Neither do we wish to be confined to the exact construction of the frame-supporting guide-rods, as they may be either round or square, and they may be rigidly attached to the saw-frame support and a sleeve provided below for them to operate in, or a groove may be formed in the rods, placed as shown, and means provided on the side of such support to engage with such grooves.

Having thus described our invention, what we claim as new, and desire to secure by Letters Patent, is—

1. In a hack-saw machine, of the character described, the combination, with suitable reciprocating mechanism and a reciprocating-saw-carrying frame, of a saw-frame support operatively mounted on angularly-disposed guides so that, when the saw-carrying frame is on its return stroke the said support will follow up such guides a sufficient distance to prevent the saw dragging on the work, and on the forward stroke will follow down said guides to reëngage the saw, for the purpose set forth.

2. In a hack-saw machine, of the character described, the combination, with suitable reciprocating mechanism and a saw-carrying frame actuated thereby, of a saw-frame support in which said saw-carrying frame is operatively mounted, said support balanced on angularly-disposed guide-rods fixed to one of the work-holding jaws, so that, by means of such guide-rods the saw is relieved on its backward stroke by said support rising on said rods, for the purpose set forth.

3. The combination, in a hack-saw machine, with suitable reciprocating mechanism, of a saw-frame support adapted to hold a reciprocating-saw-carrying frame, of angularly-disposed guide-rods or their equivalent, means on said support whereby it is adapted to operatively engage said rods so as to rise thereon when the saw is retreating and follow down such rods when the saw is advancing, for the purpose set forth.

4. The combination, in a hack-saw machine of the work-holding jaws each provided with a kerf in the body thereof to assist in keeping the saw in vertical alinement during its operation, for the purpose set forth.

5. The combination, in a hack-saw machine, of the work-holding jaws each provided with a kerf in the body thereof and guide-pins rising above said jaws and placed, one on each side of said kerf, for the purpose set forth.

6. The combination, in a hack-saw machine, of the two side supporting-rods anchored in the supporting-legs, work-holding jaws adjustably mounted on said rods, for the purpose set forth.

7. The combination, in a hack-saw machine, with a threaded-jaw-carrying rod and means for operating the same of side supporting-rods anchored in the machine-legs, a front and rear jaw adjustably mounted on said rods, the former under control of the said threaded rod and the latter temporarily secured to said side supporting-rods, said jaws provided with a narrow kerf therein to guide the saw, and guide-pins rising above said jaws and placed, one on each side of the said kerfs, a floor rigidly secured to one of said jaws and adapted to freely extend through the other of said jaws, for the purpose set forth.

8. The combination, in a hack-saw machine, of the character described, consisting of work-holding jaws and their support, a saw-frame, a support therefor on which said frame is adapted to operate, angularly-disposed guide-rods, means whereby the further downward movement of said frame is arrested so that the saw may simply reciprocate, without cutting, when it has reached its lowest point, for the purpose set forth.

9. The combination, in a hack-saw machine, of the work-holding jaws, narrow guide-kerfs in the body thereof and guide-pins extending above such jaws and placed, one on each side of said kerfs, a saw-carrying frame, a saw-frame support in which such saw-carrying frame is adapted to operate, angularly-disposed guide-rods, means whereby the further downward progress of said saw-carrying frame is arrested so that, the saw may reciprocate without cutting, for the purpose set forth.

10. In a hack-saw machine, the saw-carrying frame and a support therefor, means substantially as shown on the saw-arm-supporting rod for changing the distance between said arms so that saws of different lengths may be used in the same frame, for the purpose set forth.

11. The combination, in a hack-saw machine, of the character described, of the side rods mounted in the machine-legs, work-holding jaws adjustably mounted thereon, said jaws having each a narrow kerf in the body thereof to act as a guide for the saw, guide-pins projecting above the jaws and on each side of the said kerf, a saw-frame having an adjustable back and a support therefor in which such frame is adapted to operate, angularly-disposed guide-rods attached to one of said jaws and means whereby said frame-support is operatively mounted on said guide-rods, means whereby the further downward progress of the saw is checked or the machine stopped for the purpose set forth.

Signed at New Haven, in the county of New Haven and State of Connecticut, this 29th day of November, A. D. 1897.

FRANK S. BRADLEY.
FRANK A. COTTON.

Witnesses:
JOSEPH SHELDON,
CHAS. E. GRAHAM.